Nov. 22, 1938.   R. D. SCHWARTZ ET AL   2,137,859
FREQUENCY METER
Filed Sept. 29, 1937   2 Sheets-Sheet 1
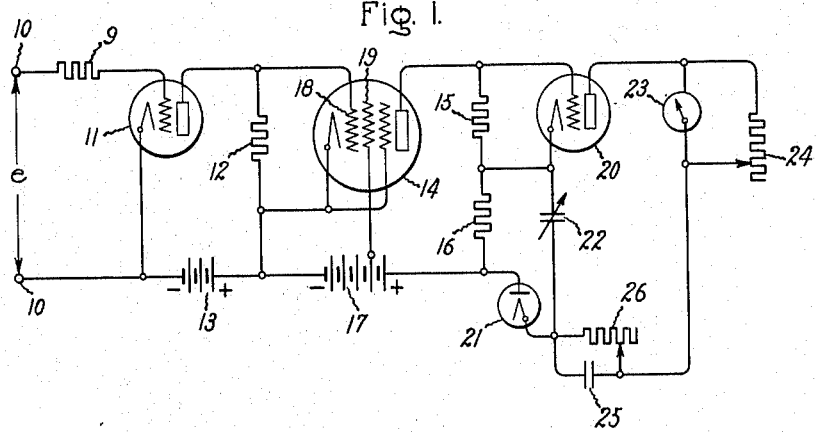
Fig. 1.
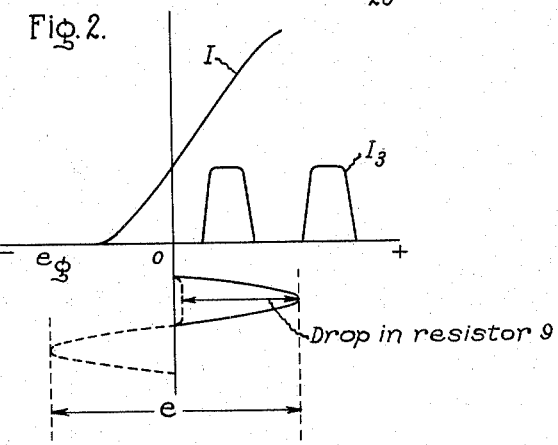
Fig. 2.
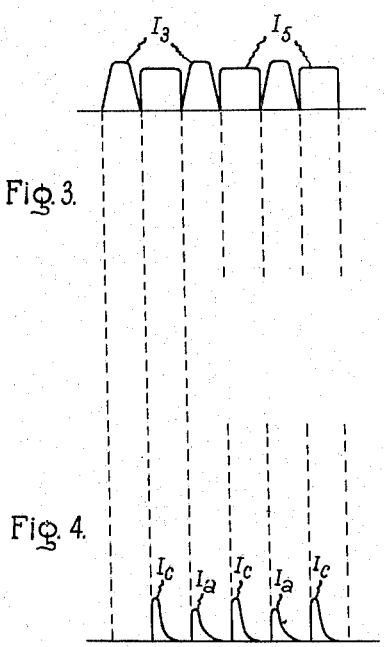
Fig. 3.
Fig. 4.
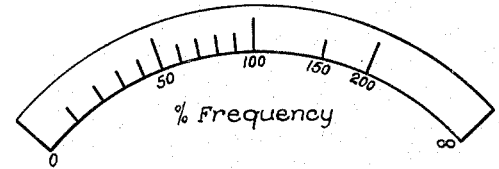
Fig. 5.
% Frequency
Inventors:
Robert D. Schwartz,
W. West Moe,
Lowell J. Hartley,
by Harry E. Dunham
Their Attorney Nov. 22, 1938.   R. D. SCHWARTZ ET AL   2,137,859
FREQUENCY METER
Filed Sept. 29, 1937   2 Sheets-Sheet 2

Inventors:
Robert D. Schwartz,
W. West Moe,
Lowell J. Hartley,
by *Harry E. Dunham*
Their Attorney.

Patented Nov. 22, 1938

2,137,859

UNITED STATES PATENT OFFICE 2,137,859

FREQUENCY METER

Robert D. Schwartz, Devon, and William West Moe and Lowell J. Hartley, Bridgeport, Conn., assignors to General Electric Company, a corporation of New York Application September 29, 1937, Serial No. 166,362

4 Claims. (Cl. 172—245)

Our invention relates to frequency-measuring apparatus and its object is to provide such apparatus which is direct reading, will cover a wide range of frequencies, and is practically independent of the voltage of the measurement frequency source. Other objects of the invention will appear as the description proceeds.

In carrying our invention into effect, relatively inexpensive vacuum-tube circuits are employed, tuned circuits are avoided, and little energy is required for its operation. Constant-current impulses varying in the rapidity of their occurrence with the frequency to be measured are sent through a resistor. A condenser connected across the resistor is charged to the voltage drop across such resistor. The charges on the condenser are sent through a circuit containing a measuring instrument and a buckling condenser shunted by a resistor, whereby the current through the instrument per unit of time increases with frequency but tends to approach a constant value at very high frequencies, depending on the adjustment of the bucking condenser resistor. This feature prevents injury to the instrument should the apparatus be subjected to frequencies higher than that for which the apparatus is calibrated.

Figure 6:
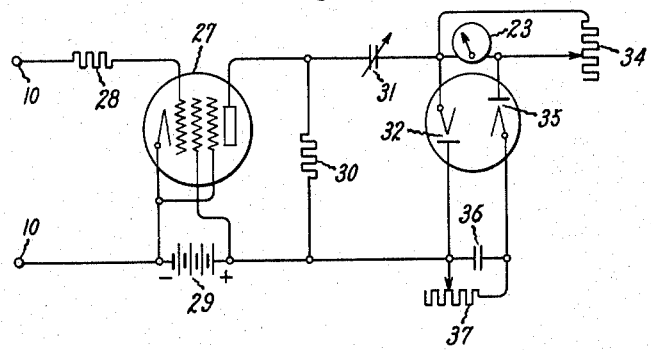
Figure 7:
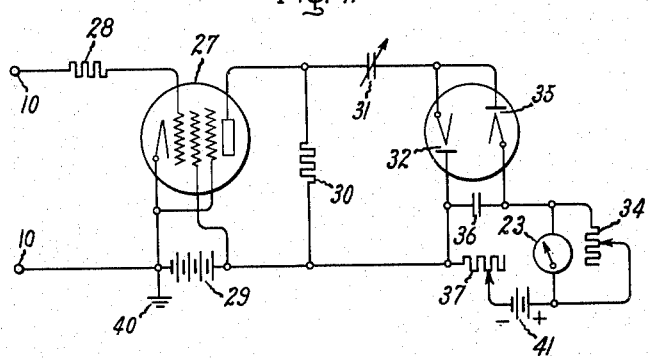
Figure 8:
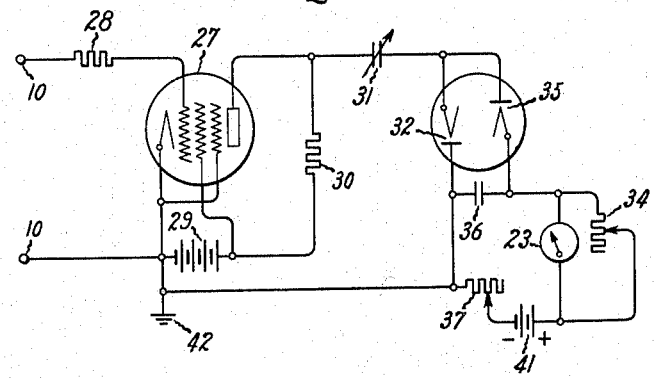

The features of our invention which are believed to be novel and patentable will be pointed out in the claims appended hereto. For a better understanding of our invention, reference is made in the following description to the accompanying drawings in which Fig. 1 represents the wiring diagram of one form of our invention; Fig. 2 represents the plate current voltage bias characteristics and the actual plate current of tube 11, Fig. 1; Fig. 3 represents the time relation and nature of current impulses produced by tubes 11 and 14, Fig. 1; Fig. 4 represents the time relation and nature of the charging and discharging currents of condenser 22, Fig. 1, also of condenser 31, Fig. 6; Fig. 5 represents the scale distribution of the measuring instrument; Fig. 6 represents a simplified and improved embodiment of our invention, and Figs. 7 and 8 represent further improvement modifications where the ammeter and its shunt circuit are placed on the grounded side of the diode circuit.

In Fig. 1, 10 represents a source of alternating-current voltage, the frequency of which is to be measured. The voltage e across terminals 10 may have most any reasonable value as long as it is sufficient to bias the tube 11 to zero bias on the positive half wave and beyond cut-off on the negative half wave. Tube 11 is a triode of high mutual conductance with its filament and grid connected across the input terminals 10 through a current limiting resistor 9. The plate circuit of tube 11 contains a resistance 12 and a suitable source of supply, such as a battery 13. The voltage e from terminals 10 drives the grid of tube 11 from a slight positive value to a value beyond cut off, as pictured in Fig. 2, where the wave e represents the voltage of source 10 as it changes from a positive value to the right and a negative value to the left of the zero vertical line 0, and I represents the current characteristic of the plate circuit of tube 11. The full line part of voltage curve e represents the drop in resistor 9 and the part represented dotted is the actual voltage form applied to the grid of tube 11 also of tube 27, Fig. 6. The tube is thus operated from cut off to about zero bias at a rate equal to the frequency of source 10, and there flows in its plate circuit current impulses, one per cycle, of the character represented at $I_3$, Figs. 2 and 3. This current passing through resistor 12 develops a voltage across it whose magnitude is large for a portion of the input cycle and is zero for another portion of the input cycle. This voltage is opposed to the voltage of battery 13 and is impressed between the filament and control grid 18 of a power pentode 14, the plate circuit of which contains resistors 15 and 16 and a suitable source of supply, such as a battery 17. Tube 14 is then biased to cut off for that portion of the input cycle when a voltage exists across resistance 12 and has zero bias for another portion of each input cycle. When there is zero bias on control grid 18, current flows in the plate circuit of the pentode 14 due to the constant positive bias of the additional grid 19 connected at a point of battery 17 which is positive with respect to the filament of this tube and thus current flows in the plate circuit of pentode 14 during portions of the input cycles when there is zero current in the plate circuit of triode 11, and this current may be represented by the impulses $I_5$, Fig. 3.

The current flowing in the plate circuit of pentode 14 develops a voltage across the resistors 15 and 16 whose sum is nearly equal to the voltage of battery 17 during the time that tube 14 has zero bias on control grid 18 and is zero when tube 14 has a high negative bias on its control grid. Resistor 15 is connected across the grid and filament of a triode 20 such that, when a voltage appears across resistor 15, a negative bias is given to triode 20 and it is held at cut off. Resistor 16 is connected in the circuit of a diode 21 with a condenser 22 such that the condenser is charged to the voltage existing across resistor 16 when current flows therein. This may be represented by $I_c$, Fig. 4. Thus, condenser 22 is being charged when tube 20 is biased to cut off. Different condenser values may be used at 22 for different frequency ranges and we have therefore represented this capacity as variable.

An ammeter 23 is contained in the plate circuit of triode 20 in series relation with condenser 22 and, when the pentode 14 is biased to cut off and no current is flowing in resistors 15 and 16, condenser 22 discharges through tube 20 and the ammeter circuit, the diode 21 meanwhile preventing the discharge of condenser 22 through resistor 16. An adjustable resistor 24 is connected in shunt to the ammeter in order that any desired portion of the current in the ammeter circuit will pass through the ammeter. The current flowing through the ammeter circuit and shunt may be represented by $I_a$, Fig. 4.

Also contained in the ammeter discharge circuit of condenser 22 is a somewhat larger condenser 25 shunted by an adjustable resistor 26 for the purpose of introducing a bucking voltage in this circuit which is proportional to the current flowing and to the resistance 26. Since the voltage of condenser 25 is opposed to the voltage of 22, the latter will discharge only to a voltage equal to the voltage across it minus the voltage of condenser 25. The voltage across resistance 16 and hence that across condenser 22 is constant for each input cycle regardless of changes in voltage of the terminals 10. However, the number of input cycles and discharges of condenser 22 through the ammeter circuit varies with frequency and hence the current through the ammeter increases with the frequency at terminals 10 but is independent of the voltage. As the frequency increases, the condenser 25 has a shorter and shorter time to discharge through resistance 26 during the time when the ammeter circuit is, in effect, opened at the valve 20 and the average voltage of condenser 25 which opposes the flow of current in the ammeter circuit increases with frequency. Hence, while the average current through the ammeter in a given period of time increases with frequency, it does not do so as the first power of the frequency but tends to approach a constant value at some high frequency, depending on the value of resistance 26. The advantage of this characteristic of the circuit is that no injury to the apparatus arises due to overloading of the ammeter, for example, irrespective of how high the frequency may rise. The apparatus is self-protecting against excessive frequencies and voltages. If resistance 26 be made equal to zero, i. e., short-circuit of condenser 25, the current in the ammeter circuit will increase as the first power of the frequency and the protection afforded by the condenser 25 and resistance 26 will cease to exist. Thus, various degrees of sensitivity, particularly with respect to the upper range of the ammeter reading, may be had by adjusting resistance 26.

For some testing purposes, we have found it convenient to so adjust the resistances 24 and 26 as to obtain a deflection of the ammeter corresponding to the scale calibration indicated in Fig. 5 where the middle of the scale corresponds to one hundred per cent of some desired known frequency, as indicated. At very much higher frequencies, the meter reading will increase only to full scale, which is marked with the sign designating infinity. The instrument is thus protected against frequencies which happen to be in excess of the useful scale range. The scale may, of course, be calibrated directly in frequency as well as in per cent of a given frequency.

In order to give one practicable example of the set-up that might be used for measuring frequencies up to 100,000 cycles per second, it may be stated that, for this purpose, one may use the following circuit conditions in Fig. 1:

Voltage across input terminals 10 from 10 to 100 volts.
Battery 13, 180 volts.
Battery 17, 300 volts.
Resistance 12, 25,000 ohms.
Resistance 15, 3,000 ohms.
Resistance 16, 10,000 ohms.
Condenser 22, adjustable between about .00015 m. f. and .1 m. f.
Condenser 25, 2 m. f.
Ammeter 23, .0002 amperes full scale.

With resistances 26 and 24 adjusted for 3000 and 80 ohms, respectively, and condenser 22 adjusted for .00015 m. f. the midscale reading of ammeter 23 corresponds to 100,000 cycles. With a condenser value at 22 equal to .02 m. f., and resistances 26 and 24 adjusted for 21,000 and 162 ohms, respectively, the midscale reading of the ammeter corresponds to 10,000 cycles.

We have found that the type of instrument above described may be improved and simplified and one improved arrangement is represented in Fig. 6.

In Fig. 6 as in Fig. 1, 10 represents the terminals to which the frequency to be measured is applied. 27 represents a power pentode with its filament and control grid connected across terminals 10. The voltage of input terminals 10 must be sufficient to drive the grid from a positive value to a value beyond plate current cut off. A resistor 28 is contained in the grid circuit to prevent the grid from drawing excessive current on positive voltage swings. The plate circuit of the pentode includes the source of supply 29 and resistance 30. During the portion of each cycle when the control grid of 27 is positive, the plate current develops in the resistor 30 a voltage drop which is constant for different voltages across terminals 10 and which is nearly equal to the voltage of battery 29. Battery 29 may be a 300 volt battery with its positive terminal connected to the resistor. Connected across resistor 30 and subject to its voltage drop is a circuit containing a condenser 31 and a diode valve 32. The condenser 31 is charged through this circuit to the peak value of the voltage across resistance 30. The discharge circuit of condenser 31 includes an ammeter 33 shunted by calibrating resistance 34, a diode valve 35, bucking condenser 36 with its shunted calibrating resistor 37, and resistor 30.

During the portion of each cycle when the control grid of 27 swings beyond plate current cut off, resistor 30 momentarily has zero voltage across it which allows the condenser 31 to discharge. When condenser 31 is charging, one-way valve 35 prevents current flow through the ammeter circuit and, when condenser 31 is discharging, one-way valve 32 requires the discharge current to flow through the ammeter circuit. The resistor 34, condenser 36, and resistor 37 perform the same functions as the resistor 24, condenser 25, and resistor 26 of Fig. 1.

If the condenser 36 is short-circuited, condenser 31 would completely discharge each cycle and the average current through the ammeter would be proportional to the first power of the number of such discharges per unit of time or the frequency to be measured. Including the bucking condenser 36 shunted by resistance 37 in the discharge circuit limits the value of each current impulse discharged by condenser 31 to something less than the value corresponding to complete discharge so that the value of the current impulses fed to the ammeter tapers off as their frequency increases until the average current through the ammeter per unit of time tends to approach a constant value with very high frequencies, giving the same kind of scale calibration of the ammeter as is represented in Fig. 5 and protecting it against damage due to excessive frequencies for any given calibration.

The diodes 32 and 35 may be contained in the same chamber as indicated.

The following circuit element values may be used in Fig. 6:

Voltages across 10 from 25 to 150 volts.
Battery 29, 300 volts.
Resistor 30, 6000 ohms.
Condenser 36, 2 m. f.
Ammeter 23, .0002 ampere full scale.

When calibrated with 45 ohms resistance in shunt to the ammeter and 20,000 ohms resistance in shunt to condenser 36 and condenser 31=.00001 m. f., midscale reading of the instrument corresponds to a frequency of 1,000,000 cycles. The device may be quickly recalibrated for 110 cycles midscale deflection by using 50 ohms at 34 and 30,000 ohms at 37, and .05 m. f. in 31.

The modifications shown in Figs. 7 and 8 differ primarily from the arrangement of Fig. 6 only with respect to the manner in which the ammeter circuit is connected. In Fig. 7, the ammeter and its shunt have been shifted to the opposite side of the diode circuit and the circuit is grounded at 40. This is preferable for very high frequencies because it reduces the capacity load on the driving tubes. A three-volt battery is also provided at 41 to eliminate emission current of the diodes. The condenser 36 is here connected in shunt to the instrument, but it will be evident that as the frequency increases, the voltage across the instrument will decrease and hence the volume of current per impulse will decrease and the instrument will be protected against excessive frequency conditions. In Fig. 8, the diode circuit is directly grounded at 42 and the measuring instrument is operated at ground potential.

In accordance with the provisions of the patent statutes, we have described the principle of operation of our invention together with the apparatus which we now consider to represent the best embodiment thereof, but we desire to have it understood that the apparatus shown is only illustrative and that the invention may be carried out by other means.

What we claim as new and desire to secure by Letters Patent of the United States, is:

1. Frequency measuring apparatus comprising a condenser having a charging circuit, means responsive to the frequency to be measured for charging the condenser to a constant voltage once per cycle of such frequency, a discharge circuit for said condenser including an ammeter, valve means in the charging and discharging circuits of said condenser for preventing the charging current from flowing in the ammeter circuit and causing the discharge current to flow in the ammeter circuit, and a bucking condenser shunted by a resistance included in the discharge circuit for reducing the value of the discharge current impulses through the ammeter circuit as their number per unit of time increases with the frequency, whereby the deflection of the ammeter increases with frequency, but tends to approach a constant maximum deflection at very high frequencies.

2. Frequency measuring apparatus comprising a resistor, means for causing current impulses of constant magnitude to flow in the resistor at the rate of one impulse per cycle of the frequency to be measured and causing constant voltage impulses to appear across said resistor, a condenser connected so as to be charged by such constant voltage once per cycle, a discharge circuit for said condenser, a current measuring instrument in the discharge circuit and influenced by the discharge current, valve means connected in the charging and discharge circuits of the condenser which prevent the charging current from flowing in the discharge circuit and cause the discharge current to flow therein, and means in the discharge circuit for reducing the magnitude of the current impulses discharged by said condenser as the frequency of such impulses increases.

3. A frequency measuring apparatus comprising a resistor, means responsive to the frequency of the source to be measured, but independent of the voltage of such source for sending current impulses through said resistor, which impulses are of constant value, unidirectional, and occur once per cycle of such frequency source, a condenser, a charging circuit for said condenser connected across said resistor, a discharge circuit for said condenser, a measuring instrument in said discharge circuit and responsive to the current flow therein, valve means in the discharge circuit for preventing the flow of charging current therein, valve means in the charging circuit for preventing the flow of discharge current therein and a condenser, larger than the first mentioned condenser, in the instrument circuit and having a leakage resistance in shunt relation therewith for reducing the magnitude of the discharge current impulses as their frequency increases.

4. Frequency measuring apparatus comprising a resistor, an electron tube having an input circuit connected to be influenced by the frequency of the source of supply to be measured and having an output circuit which includes said resistor, said electron tube serving to send unidirectional current impulses of equal value through said resistor once per cycle, a condenser connected to be charged by the voltage across said resistor, a discharge circuit for said condenser, a direct current measuring instrument connected to be influenced by the discharge current of said condenser, means for preventing said instrument from being influenced by the charging current of said condenser, and means in said discharge circuit for reducing the volume of current discharged therein per cycle as the frequency of such discharges increases.

ROBERT D. SCHWARTZ
W. WEST MOE.
LOWELL J. HARTLEY.